United States Patent
Yeung et al.

(10) Patent No.: US 10,047,774 B2
(45) Date of Patent: Aug. 14, 2018

(54) MAGNETIC FASTENER ASSEMBLIES

(71) Applicant: Wai Yue Yeung, Kowloon (HK)

(72) Inventors: Wai Yue Yeung, Kowloon (HK); Lin Huang, Kowloon (HK)

(73) Assignee: Wai Yue Yeung, Kowloon (HK)

( * ) Notice: Subject to any disclaimer, the term of this patent is extended or adjusted under 35 U.S.C. 154(b) by 179 days.

(21) Appl. No.: 14/845,314

(22) Filed: Sep. 4, 2015

(65) Prior Publication Data

US 2016/0363142 A1 Dec. 15, 2016

(30) Foreign Application Priority Data

Jun. 12, 2015 (HK) .................................. 15105609

(51) Int. Cl.
 *F16B 1/00* (2006.01)
 *F16B 7/04* (2006.01)

(52) U.S. Cl.
 CPC .............. *F16B 1/00* (2013.01); *F16B 7/0426* (2013.01); *F16B 2001/0035* (2013.01)

(58) Field of Classification Search
 CPC ... F16B 1/00; F16B 2001/0035; F16B 7/0426
 See application file for complete search history.

(56) References Cited

U.S. PATENT DOCUMENTS

| | | | | |
|---|---|---|---|---|
| 6,131,247 A * | 10/2000 | Morita | ................ | A45C 13/1069 24/303 |
| 6,182,336 B1 * | 2/2001 | Bauer | .................... | A41F 1/002 24/303 |
| 6,295,702 B1 * | 10/2001 | Bauer | ................. | A45C 13/1069 24/303 |
| 6,606,767 B2 * | 8/2003 | Wong | ..................... | A41F 1/006 24/303 |
| 6,622,349 B2 * | 9/2003 | Wong | ..................... | A41F 1/006 24/303 |
| 6,981,391 B2 * | 1/2006 | Suzuki | ................. | A44C 5/2076 24/303 |
| 7,178,207 B2 * | 2/2007 | Wong | ..................... | A41F 1/002 24/303 |
| 8,353,544 B2 * | 1/2013 | Fiedler | ............... | A45C 13/1069 24/303 |
| 2012/0117764 A1 * | 5/2012 | Wong | ..................... | A41F 1/002 24/302 |
| 2012/0291227 A1 * | 11/2012 | Fiedler | ..................... | A42B 3/04 24/3.3 |
| 2013/0276269 A1 * | 10/2013 | Su | ........................ | A44B 11/001 24/303 |
| 2015/0322996 A1 * | 11/2015 | Mitchell | ................. | F16B 45/04 24/303 |

* cited by examiner

*Primary Examiner* — Robert Sandy
*Assistant Examiner* — Louis A Mercado
(74) *Attorney, Agent, or Firm* — Nixon Peabody LLP; Jeffrey L. Costellia

(57) ABSTRACT

A magnetic fastener assembly has counterpart magnetic fastener members that are in detachable magnetic coupled fastening engagement. The magnetic fastener assembly are configurable between an axes aligned magnetic coupled fastening engagement and axes nonaligned magnetic coupled fastening engagement. The counterpart magnetic fastener members are detachable when in the axes aligned magnetic coupled fastening engagement and not detachable when in the axes non-aligned magnetic coupled fastening engagement when subject to an axial separation force.

20 Claims, 4 Drawing Sheets

Figure 4:
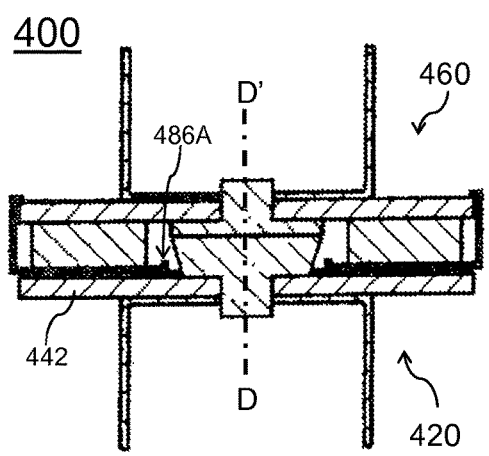

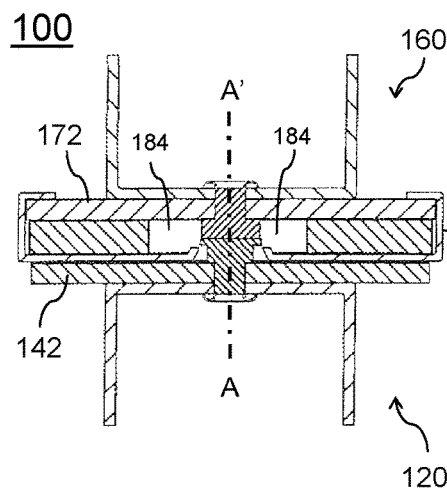
Fig. 1
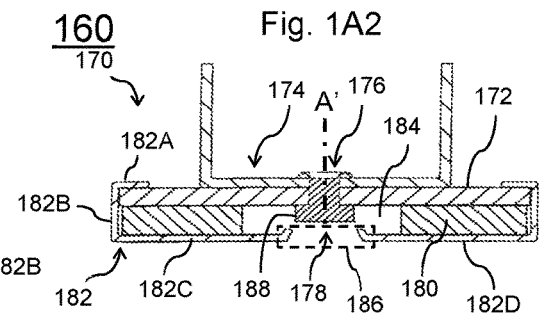
Fig. 1A2
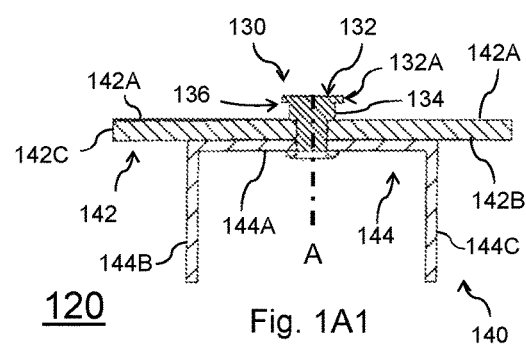
Fig. 1A1
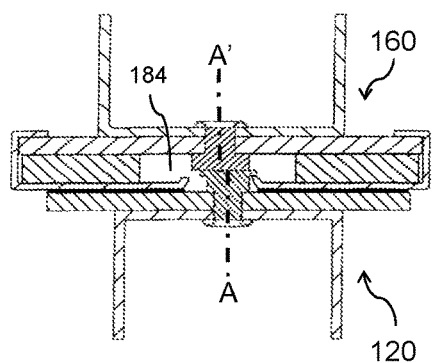
Fig. 1B
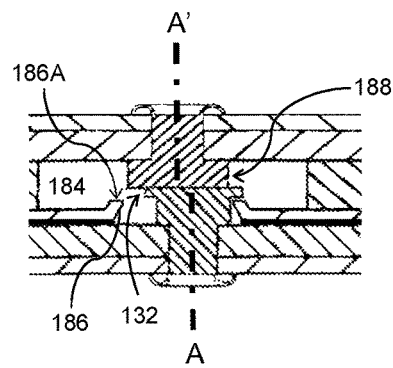
Fig. 1B1
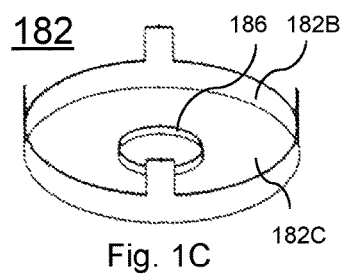
Fig. 1C
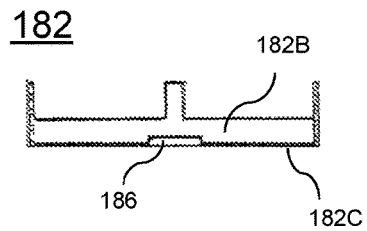
Fig. 1C1

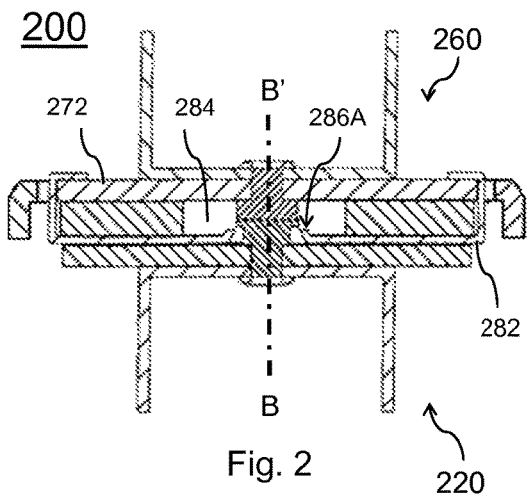
Fig. 2
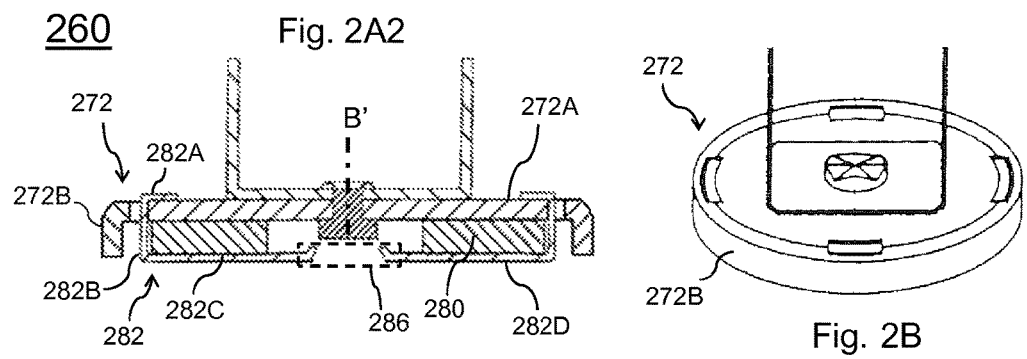
Fig. 2A2
Fig. 2B
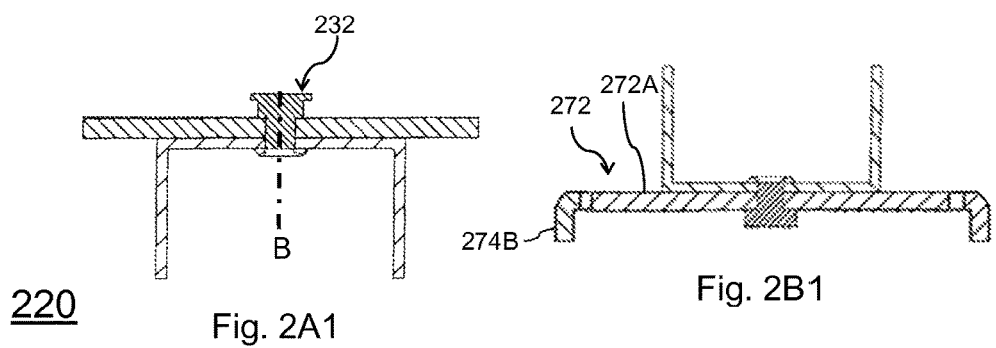
Fig. 2A1
Fig. 2B1

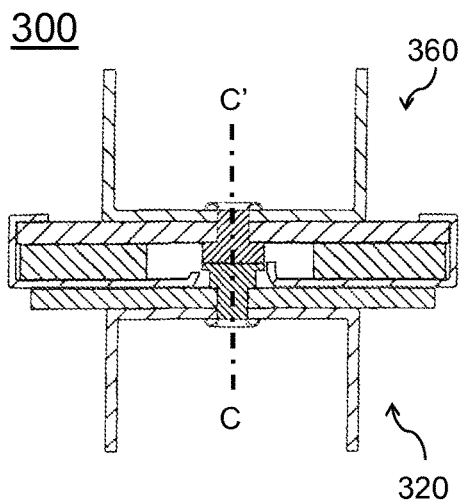
Fig. 3
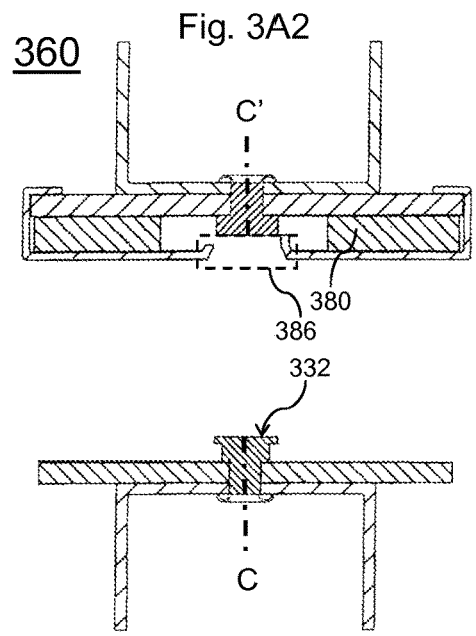
Fig. 3A2
Fig. 3A1
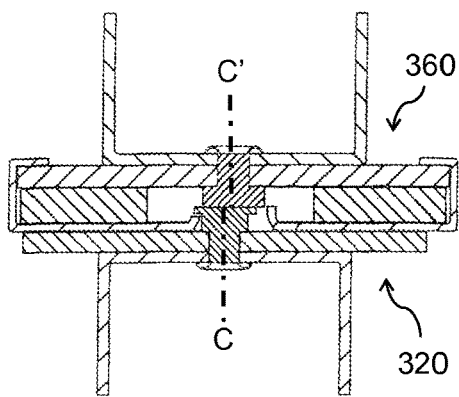
Fig. 3B
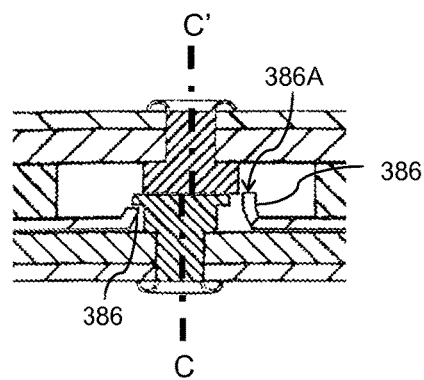
Fig. 3B1
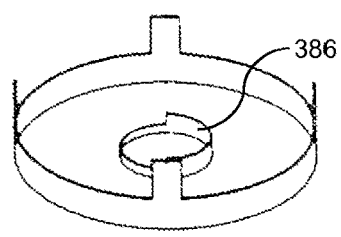
Fig. 3C
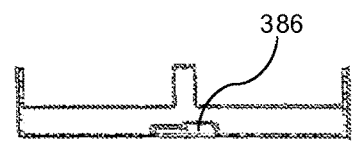
Fig. 3C1

Fig. 4A2

Fig. 4A1

MAGNETIC FASTENER ASSEMBLIES

FIELD

The present disclosure relates to magnetic fastener members, magnetic fastener assemblies and article comprising same.

BACKGROUND

Magnetic fasteners are a useful alternative to their non-magnetic counterparts. Magnetic fasteners typically comprise counterpart fastener members of complementary magnetic properties which are attached on separate parts. In use, the separate parts are held together by magnetic fastening operation when the counterpart fastener members are in magnetic proximity. When the parts are to be separated, a separation force is applied on the counterpart fastener members in a separation direction opposite to a magnetic fastening direction. The separation force counters magnetic attraction force to separate the counterpart fastener members out of magnetic proximity.

Example magnetic fasteners are disclosed in, for example, US2012/0117764 (Wong), U.S. Pat. No. 6,622,349 (Wong) & U.S. Pat. No. 6,606,767 (Wong).

Magnetic fasteners are a useful alternative to their magnetic non-counterparts. Magnetic fasteners having enhanced measures against inadvertent detachment would be beneficial and advantageous.

DISCLOSURE

There is disclosed a magnetic fastener assembly having counterpart magnetic fastener members that are in detachable magnetic coupled fastening engagement. The magnetic fastener assembly are configurable between an axes aligned magnetic coupled fastening engagement and axes non-aligned magnetic coupled fastening engagement. The counterpart magnetic fastener members are detachable from each other from magnetic coupled engagement when in the axes aligned magnetic coupled fastening engagement and are to resist axial detachment when in the axes non-aligned magnetic coupled fastening engagement when subject to an axial separation force.

FIGURES

Figure 5A:
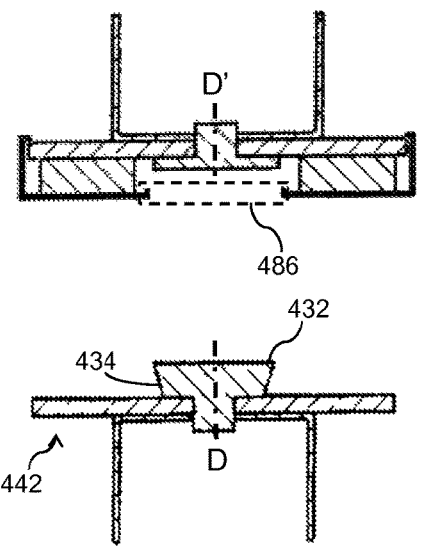
Figure 5A:
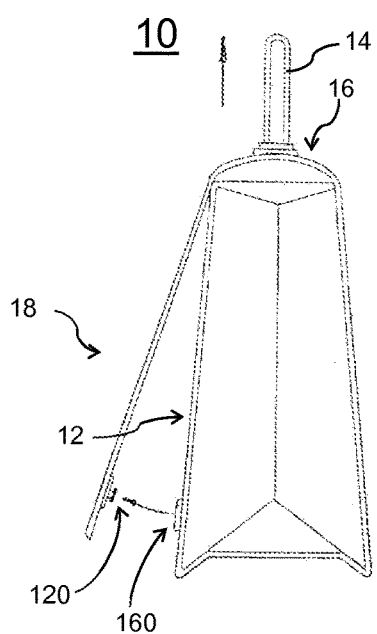
Figure 5B:
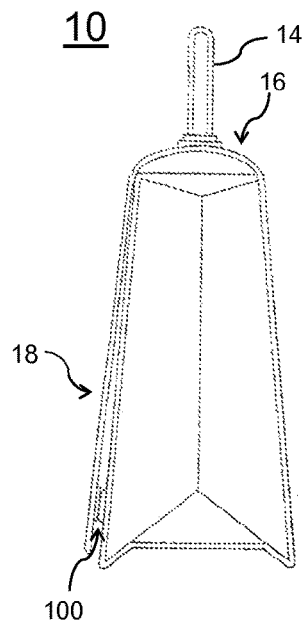

The disclosure will be described by way of example with reference to the accompanying Figures, in which:

FIG. 1 is longitudinal cross sectional view of an example magnetic fastener assembly in aligned magnetic coupled fastening engagement, FIG. 1A1 is a longitudinal cross sectional view of a first fastener member of the example magnetic fastener assembly of FIG. 1, FIG. 1A2 is a longitudinal cross sectional view of a second fastener member of the example magnetic fastener assembly of FIG. 1, FIG. 1B is a longitudinal cross sectional view of the magnetic fastener assembly of FIG. 1 in non-aligned magnetic coupled fastening engagement, FIG. 1B1 is an enlarged view showing a portion of FIG. 1B, FIG. 1C is a perspective view of an external casing before assembly, FIG. 1C1 is a longitudinal cross-sectional view of the external casing of FIG. 1C, FIG. 2 is longitudinal cross sectional view of an example magnetic fastener assembly in aligned magnetic coupled fastening engagement, FIG. 2A1 is a longitudinal cross sectional view of a first fastener member of the example magnetic fastener assembly of FIG. 2, FIG. 2A2 is a longitudinal cross sectional view of a second fastener member of the example magnetic fastener assembly of FIG. 2, FIG. 2B is a perspective view of a sub-assembly of the second fastener member of FIG. 2, FIG. 2B1 is a longitudinal cross-sectional view of the sub-assembly of FIG. 2B, FIG. 3 is a longitudinal cross-sectional view of an example magnetic fastener assembly in aligned magnetic coupled fastening engagement, FIG. 3A1 is a longitudinal cross sectional view of a first fastener member of the example magnetic fastener assembly of FIG. 3, FIG. 3A2 is a longitudinal cross sectional view of a second fastener member of the example magnetic fastener assembly of FIG. 3, FIG. 3B is a longitudinal cross sectional view of the example magnetic fastener assembly of FIG. 3 in non-aligned magnetic coupled fastening engagement;

FIG. 3B1 is an enlarged view showing a portion of FIG. 3B,

FIG. 3C is a perspective view from a rear side of a second housing portion of the second fastener member before assembly, FIG. 3C1 is a longitudinal cross-sectional view of the external casing of FIG. 3C, FIG. 4 is a side view of an example magnetic fastener assembly, FIG. 4A1 is a longitudinal cross sectional view of a first fastener member of the example magnetic fastener assembly of FIG. 4, FIG. 4A2 is a longitudinal cross sectional view of a second fastener member of the example magnetic fastener assembly of FIG. 4, FIG. 5A is a schematic view depicting an article according to the present disclosure, and FIG. 5B is a schematic view depicting an article according to the present disclosure.

DESCRIPTION

A magnetic fastener assembly 100 depicted in FIG. 1 comprises a first fastener member 120 and a second fastener member 160. The first fastener member 120 and a second fastener member 160 are in magnetic coupled fastening engagement and aligned along a coupling axis A-A'.

The first fastener member 120 comprises a first retention part 130 which is mounted on a first housing part 140, as depicted in FIG. 1A1.

The first housing part 140 comprises a metal slab 142 and an attachment device 144. The metal slab 142 comprises a front surface 142A, a rear surface 142B, and a peripheral surface 142C which interconnects and surrounds the front 142A and the rear 142B surfaces.

The attachment device 144 comprises an elongate bridging portion 144A and attachment pins 144B, 144C. The bridging portion 144A and the attachment pins 144B, 144C are integrally formed from an elongate metal slab, with the attachment pins 144B, 144C formed at opposite longitudinal ends of the bridging portion 144A. The attachment pins 144B, 144C are at right angle to the bridging portion 144A.

The attachment device 144 is mounted on the underside of the first housing part 140 with the attachment pins 144B, 144C extending axially away from the metal slab 142 and the bridging portion in abutment with the rear surface 142B of the metal slab 142.

The first retention part comprises a head portion 132 and a neck portion 134. The neck portion 134 extends to project above the front surface 142A of the metal slab 142 and extends in an axial direction away from the front surface 142A.

The head portion 132 includes an overhanging portion 132A which extends radially or transversely from the neck portion 134 and is at an axial elevation above the front surface 142A. The overhanging portion 132A forms a peripheral portion which projects transversely from and overhangs the neck portion. The overhanging portion 132A and the neck portion 134 are integrally formed and co-operate to define a latching part for cooperation with a corresponding latching part on the second fastener part.

A retention protrusion 136 comprising the head portion 132 and the neck portion 134 is mounted to the metal slab 142, for example by riveting. To facilitate quick and secured riveting, the example retention protrusion 136 is an upper part of a rivet which includes a narrowed stem portion below the neck portion 134. When forming the first fastener member 120, corresponding rivet apertures on the metal slab 142 and the bridging portion 144A are aligned. Then, the narrowed stem portion is inserted through the apertures and a rivet bind is formed when the metal slab 142 and the bridging portion 144A are tightened together. A stepped portion is formed between the low end of the neck portion 134 and the front surface 142A further help to form a more securely mounted retention protrusion 136.

In some embodiments such as the present, the front surface 142A is to function as a magnetic coupling surface to enter into magnetic coupled engagement with a corresponding magnetic coupling surface on the second fastener member during releasable fastening engagement, and the metal slab 142 is formed of a ferromagnetic material.

In some embodiments such as the present, the retention protrusion is also to cooperate with an alignment arrangement on the second fastener member 160, and the retention protrusion is magnetic and formed of a ferromagnetic material.

In this specification, a ferromagnetic material is magnetic active if the ferromagnetic material is magnetized to have magnetic flux sufficient to attract a counterpart non-active ferromagnetic body. A ferromagnetic material is magnetic passive or non-active if the ferromagnetic material is not-magnetized to have a magnetic flux sufficient to attract a non-magnetized ferromagnetic body. Magnetic properties are complementary herein when they are an active-and-passive pair or an active-and-active pair in opposite magnetic polarities.

The ferromagnetic material of the example first fastener member 120 is non-magnetized stainless steel and is magnetically passive.

The first fastener member 120 has an axis A which extends in an axial direction to pass through the first fastener member 120. In some embodiments, the axis A passes through the assembly comprising the metal slab 142 and the retention protrusion 136. Where the attachment device comprises a bridging portion, the axis A also passes through the bridging portion.

The axis A is an axis of lateral or circular symmetry of the first fastener member 120 in some embodiments. In some embodiments as the present, the metal slab 142 has a circular front surface 142A and the axis A is an axis of circular symmetry. The axis A' is also an axis of lateral symmetry of the head portion 132 or an axis of circular symmetry of the head portion 132 where the forward facing front surface of the head portion 132 is circular.

The second fastener member 160 comprises a second housing part 170 on which a second retention part is formed. The second housing part comprises a metal slab 172 of ferromagnetic materials, an attachment device 174, a magnet slab 180 and an external casing 182.

The metal slab 172 and the attachment device 174 are mounted together by riveting in a manner similar to the rivet binding of the metal slab 142 and attachment device 144 of the first fastener member 120. A ring magnet slab 180 is placed on a free surface of the metal slab 172 that is distal from the attachment device 174 and is held firmly in place on the ferromagnetic metal slab 172 by magnetic attraction between the magnet slab 180 and the ferromagnetic metal slab 172.

An external casing 182 formed of ferromagnetic materials is formed around a sub-assembly comprising the metal slab 172 and the magnet slab 180. The external casing 182 comprises a rear portion 182A which is in abutment with a rear surface of the metal slab 172 that is distal from the magnet slab 180, a peripheral wall 182B that is in abutment with or proximal to peripheral walls of the metal slab 172 and the magnet slab 180, and a front portion 182C which is in physical abutment with a front magnetic surface of the magnet slab 180. As the front portion 182C is in physical abutment with the magnet slab 180, the forward facing front surface 182D of the external casing 182, which is also the forward facing free surface of the front portion 182C is magnetic active and has a same magnetic polarity as the front magnetic surface of the magnet slab 180.

As depicted in FIGS. 1C and 1D, the external casing 182 has a circular front portion 182C, a peripheral wall portion 182B extending along the outer circular edge of the front portion 182C and projecting orthogonally to define a compartment of substantially cylindrical shape, and a plurality of (four, in this example) legs dependent from the peripheral wall portion 182B. The legs are evenly distributed around the circular edge and are bent to form clamping claws on assembly to tightly clamp on the rear side of the metal slab 172. The clamping claws become the rear portion 182A when assembled.

The front portion 182C, the central or ring aperture of the ring magnet slab 180 and the metal slab 172 cooperate to define a reception compartment 184, which is also referred to as a retention compartment 184.

The front portion 182C of the external casing 182 extends radially inwards from the peripheral wall 182B to define reception aperture 178 and a collar portion 186 surrounding the reception aperture 178. The collar portion extends axially inwards towards the metal slab 172 and has a collar end 186A at its free axial end which defines an entry aperture. The collar portion 186 tapers to narrow as it extends towards the metal slab 172 or the interior of the reception compartment 184. Due to tapering in the axial direction, the collar end 186A limits the lateral dimensions of the head portion 132 which can enter the retention compartment 184 on axial entry.

An alignment protrusion is formed inside the retention compartment 184. The alignment protrusion comprises an alignment head 188 which projects from the metal slab 172 and extends axially towards the reception aperture but stops before reaching the collar end 186A. The axial clearance between the alignment head 188 and the collar end 186A is slightly larger than the axial extent of the head portion 132 of the first fastener member 120 so that the head portion 312 is free to translate laterally or transversely while in physical abutment with the alignment head 188 when inside the retention compartment 184.

The shape and dimensions of the alignment head 188 in the transverse direction is comparable to that of the head portion 132 of the first retention part 130 so that the peripheral walls of the head portion 132 and the alignment head 188 are axially aligned or substantially aligned.

The alignment protrusion in this example is an integral extension of the rivet that holds the metal slab 172 and the attachment device 174 tightly together.

The alignment protrusion is magnetic active and the alignment head 188 has a magnetic polarity that is opposite to the magnetic polarity on the forward facing front surface 182D of the external casing 182.

In some embodiments such as the present, the magnetic flux or force of the alignment protrusion is obtained from the magnet slab 180 via the magnetic surface of the magnet slab 180.

In some embodiments, the alignment protrusion is magnetic active and the magnetic polarity on the alignment head 188 may be the same or opposite to that of the front surface 182D of the external casing 182.

Where the alignment head 188 is magnetic active, magnetic attraction force between the alignment head 188 and the corresponding head portion 132 would operate to expedite guided magnetic coupling between the counterpart fastener members 120, 160.

In some embodiments, the magnetic active alignment head 188 has a magnetic flux or a magnetic attraction force which is sufficient to enter into magnetic coupling with the counterpart head portion 132 to form part of the magnetic coupled engagement between the counterpart fastener members 120, 160.

In some embodiments, the alignment protrusion is magnetic passive and does not have a magnetic polarity until coming into magnetic coupling with a magnet or a magnetic active counterpart.

In some embodiments such as the present, the alignment arrangement comprises a combination of the collar portion and the alignment protrusion. The collar portion and the alignment protrusion are to cooperate to facilitate guided magnetic coupled engagement between the counterpart fastener members 120, 160 to enter into the magnetic coupled engagement.

In some embodiments, the alignment arrangement may comprise of the collar portion or the alignment head.

Other forms of alignment arrangement to facilitate guided alignment between the first and the second fastener members in the course of entering into magnetic coupling may be used as an alternative or in combination without loss of generality.

In some embodiments such as the present, the front surface 182D is to function as a magnetic coupling surface to enter into magnetic coupled engagement with a corresponding magnetic coupling surface on the first fastener member during releasable fastening engagement.

Where the front surface 182D of the second fastener member 160 is to function as a magnetic coupling surface to cooperate with the front surface 142A to form magnetic coupling, the front surface 182D of the second fastener member 160 have comparable surface shapes and dimensions to form optimal magnetic coupling.

In some embodiments, the front surface 182D and the front surface 142A are not in physical abutment or magnetic coupling when in magnetic coupled engagement. For example, magnetic coupling may be between the alignment head 188 and the head portion 132.

The second fastener member 160 has an axis A' which extends in an axial direction and passes through the second fastener member 160. In some embodiments, the axis A' passes through the assembly comprising the metal slab 172 and the alignment protrusion 176. Where the attachment device comprises a bridging portion, the axis A' also passes through the bridging portion.

In some embodiments such as the present, the axis A' is an axis of lateral or circular symmetry of the second fastener member 160.

In some embodiments such as the present, the front portion 182C of the external casing 182 has a circular outline to define a circular front coupling surface, the axis A' is an axis of circular symmetry.

In some embodiments such as the present, the collar portion 186 has a circular cross-section and the axis A' is an axis of circular symmetry.

Where there is an alignment protrusion, the axis A' may be an axis of lateral or circular symmetry of the alignment protrusion.

To form an integral part of a separable article, attachment pins on a fastener member are inserted into a holding surface of the article and bent to form a retention kink. When in general use, the first and second fastener members are attached to strap ends, separate parts of an article or other holding surfaces using attachments means such as attachment clips, sewing, stitching, welding or gluing without loss of generality. Attachments pins are used as a convenient example of attachment means herein.

The first fastener member 120 and the second fastener member 160 are adapted to cooperate as a pair of counterpart releasable magnetic fastener members. In a typical use, the first fastener member 120 and the second fastener member 160 are brought towards each other with the front surface 142A of the first fastener member 120 oppositely facing the front surface 182D of the second fastener 160. When the first 120 and the second 160 fastener members are in magnetic proximity, magnetic attraction force will bring the first 120 and the second 160 fastener members to move relative towards each other and enter into aligned magnetic coupled engagement. When the counterpart fastener members 120, 160 are brought into a configuration of aligned magnetic coupled engagement, the axes A and A' are aligned and the counterpart fastener members 120, 160 are coupled in alignment along the coupling axis A-A'. When in the configuration of aligned magnetic coupled engagement as depicted in FIG. 1, the front surface 142A and the front surface 182D operate as counterpart magnetic coupling surfaces and are in physical abutment.

When the first fastener member 120 and the second fastener member 160 are in magnetic proximity and move relatively towards each other under magnetic attraction, guide means on the counterpart fastener members 120, 160 cooperate to guide the counterpart fastener members 120, 160 into aligned magnetic coupled engagement along the coupling axis A-A'. In this example, magnetic attraction between the counterpart fastener members 120, 160 operates to guide the counterpart fastener members 120, 160 to move towards each other. The collar portion 186 of the second fastener member 160 and the protruding head portion 132 of the first fastener member 120 then cooperate to guide the counterpart fastener members 120, 160 to move along the coupling axis A-A' into aligned magnetic coupled engagement.

After the first fastener member 120 and the second fastener member 160 have moved into the aligned magnetic engagement position and when counterpart fastener members 120, 160 are in aligned magnetic coupled engagement along the coupling axis A-A', application of an axial separation force at opposite axial ends of the magnetic fastener assembly 100 and along the coupling axis A-A' will move the first fastener member 120 and the second fastener member 160 away from each other to separate and detach.

When the magnetic fastener assembly 100 in the aligned magnetic engagement position and a relative lateral shifting or shearing force is applied to the counterpart fastener members 120, 160, the counterpart fastener members 120, 160 will be laterally or transversely offset or shifted from each other from the aligned magnetic engagement position of FIG. 1 and moved into a non-aligned magnetic engagement position with the axis A laterally offset or shifted from the axis A', as depicted in FIGS. 1B and 1B1.

When the magnetic fastener assembly 100 is in the non-aligned magnetic engagement position, the first fastener member 120 and the second fastener member 160, and the associated retention arrangement, are in a latchable configuration. In this latchable configuration, the overhanging portion 132A of the head portion 132 projects axially and directly over the collar end 186A.

Application of an axial separation force in a direction parallel to the coupling axis A-A' at opposite axial ends of the magnetic fastener assembly 100 while in this latchable configuration will bring the first fastener member 120 and the second fastener member 160, and the associated retention arrangement, into a latched configuration, and the first fastener member 120 and the second fastener member 160 would not separate.

A flapped brief case 10 depicted in FIG. 5A illustrates an example application of the magnetic fastener assembly 100 of the present disclosure. The flapped brief case 10 is made primarily of leather and comprises a container portion having a front panel 12 and a back panel which is spaced apart from the front panel 12, a handle portion 14 mounted on a top panel 16, a flap portion 18 and a magnetic fastener assembly 100 comprising a pair of counterpart fastener members 120, 160. The container portion comprises a peripheral wall and a bottom panel which cooperate to define a hollow storage compartment for receiving articles such as documents. The top panel 16 is movable about a top edge on the back panel as a hinge so that the top panel is pivotally movable about the top edge between an opened configuration to expose the interior of the storage compartment and a closed configuration when the top panel span across the top of the storage compartment. The flap portion 18 continues and extends from away a front edge of the top panel and is pivotally movable about the front edge between a first pivotal configuration overhanging the front panel 12 as depicted in FIG. 5A and a second pivotal configuration in abutment with the front panel 12 as depicted in FIG. 5B.

The counterpart fastener members are separately mounted on corresponding locations on the flap portion 16 and the front panel 12. In the example of FIG. 5A, the first fastener member 120 is mounted on the movable flap portion 18 and the second fastener member 160 is mounted on the front panel 12.

When the flap portion 18 is in the first pivotal configuration detached from the front panel, upward lifting of the handle portion 14 will bring about clockwise pivotal movement of the top panel 16 about the top edge as well as movement of the flap portion relative to the front panel 12.

When the flap portion 18 is in the first pivotal configuration and detached from the front panel, movement of the flap portion 18 towards the front panel 12 while the handle portion is at rest will bring the first fastener member 120 into magnetic proximity of the second fastener member 160. When in this magnetic proximity, magnetic attraction force between the counterpart magnetic fasteners 120, 160 will bring the counterpart fastener members into the aligned magnetic engagement position of FIG. 1 and the flap portion 18 into the second pivotal configuration.

When the flap portion 18 is in the second pivotal configuration and attached to the front panel due to magnetic coupled engagement between the counterpart fastener members 120, 160, upward lifting of the handle portion 14 will shift the flap panel slightly upwardly along and relative to the front panel 12 due to the load in the container portion. This also shifts the magnetic fastener assembly 100 from the aligned magnetic engagement position of FIG. 1 into the non-aligned magnetic engagement position of FIGS. 1A1 and 1A2 with the retention arrangement in the latched configuration.

While the first fastener member 120 is mounted on the flap portion 18 in the example of FIG. 5A, the first fastener member 120 may be mounted on the front panel 12 as an alternative without loss of generality.

In example applications, where no substantial transversal loading force is applied to the magnetic fastener assembly, external casing 182 is made of 0.2 mm thick steel plate.

In other applications, where substantial transversal loading force is applied to the magnetic fastener assembly, external casing 182 is made of 0.3 mm or 0.4 mm thick steel plate.

In other example applications, the counterpart fastener members are attached on separable holding surfaces of an article which are joined by the magnetic fastener assembly. In such applications, the holding surfaces are subject to a separation force or a separation tension applied at an angle to or transversely to the magnetic coupling direction of the counterpart fastener members. The resistance of the magnetic fastener assembly against axial separation while in the non-aligned magnetic engagement position and under separation tension at an angle or transverse to the coupling axis mitigates risks of inadvertent detachment and is comforting to users. Articles having straps such as brasseries, belts, chest straps and rucksacks, are example of articles that has the aforesaid tensioning properties during use and are therefore particularly suitable for incorporating magnetic fastener assemblies of the present disclosure.

In example use, counterpart fastener members are mounted at longitudinal ends of a strap or at spaced apart locations along a length or a longitudinal direction of the strap, with counterpart coupling surfaces of the counterpart fastener members facing away from the strap body such that the coupling direction is orthogonal, transverse or at an angle to the length of the strap. The length of the strap defines a longitudinal direction when the magnetic fastener assembly is subject to a shear tension applied along the length of the strap.

An example magnetic fastener assembly 200 depicted in FIG. 2 comprises a first fastener member 220 of FIG. 2A1 and a second fastener member 260 of FIG. 2A2. The first fastener member 220 and a second fastener member 260 are in magnetic coupled fastening engagement and aligned along a coupling axis B-B'. In this example, the first fastener member 220 is identical to the fastener member 120 and the second fastener member 260 is identical to the fastener member 160 except for construction of the metal slab 272 and the external casing 282. The description herein in relation to the magnetic fastener assembly 100 and the counterpart fastener members 120, 160 are incorporated herein, mutatis mutandis, with the corresponding numerals increased by 100 and the axes A and A' to become B and B' respectively.

Referring to FIGS. 2A2, 2B and 2B1, the metal slab 272 comprises a base portion 272A and a peripheral portion 272B extending from an outer peripheral edge of the base portion 272B and surrounding the base portion 272A. The base portion 272A is circular or substantially circular to follow outline of the magnet slab 280 and the peripheral portion 272B extends in an axial direction (that is, parallel to axis B') and away from the attachment device or in the direction of the second coupling surface. A plurality of (four, in this example) claw reception apertures is formed at the outer peripheral edge of the base portion 272B. In some embodiments such as the present, the claw reception apertures are distributed at even intervals around the circular edge for receiving fastening claws on the external casing.

The external casing 282 is made of a ferromagnetic material and comprises a front portion 282C, a peripheral wall portion 282B projecting orthogonally from the front portion 282C and extending along the outer peripheral edge of the front portion 282C, and a plurality of bendable legs projecting axially away from the peripheral wall portion 282B and the front portion 282C. The front portion 282 has a shape and dimensions comparable to the shape and dimensions of the base portion 272A of the metal slab 272 as delimited by the distributed claw reception apertures. The legs are distributed to correspond to the distribution of the claw reception apertures and are sized for insertion through the claw reception apertures to form clamping claws.

To assemble the second fastener member 260, the legs on the external casing 282 are inserted through the claw reception apertures after the magnet slab 280 is on the front surface of the metal slab 272 subassembly of FIG. 2B1. After insertion, the legs are bent to form clamping claws when the front portion 282C is in tight abutment with the magnet slab 280. After formation of the clamping claws, the magnet slab 280 is tightly held by the external casing 282, the front surface 282D of the front portion 282C of the external casing becomes the second coupling surface, the clawed portions become the rear portion 282A of the external housing 282 and is in tight abutment with the base portion 272A of the metal slab 272 and the peripheral wall portion 282B of the external housing 282 is surrounded by the upstanding peripheral wall 272B of the metal slab 272. The magnet slab 280, the metal slab 272 and the front portion 282C of the external casing 282 cooperate to define a retention compartment 284. The mounting arrangement comprising a plurality of fastening claws in cooperation with a corresponding plurality of claw reception apertures operates to mitigate or acts against relative rotation between the metal slab 272 and the external casing 282.

In some embodiments, the front portion 282C is at an axial level beyond or flush with the edge of upstanding peripheral wall 272B of metal slab 272 along axis B'.

An example magnetic fastener assembly 300 depicted in FIG. 3 comprises a first fastener member 320 and a second fastener member 360. The first fastener member 320 and a second fastener member 360 are in magnetic coupled fastening engagement and aligned along a coupling axis C-C'. In this example, the first fastener member 320 is identical to the fastener member 120 and the second fastener member 360 is identical to the fastener member 160 except for the collar portion 386. The description herein in relation to the magnetic fastener assembly 100 and the counterpart fastener members 120, 160 is incorporated herein, mutatis mutandis, with the corresponding numerals increased by 200 and the axes A and A' to become C and C' respectively. The collar portion 386 of the second fastener member 360 has non-uniform axial depths on opposite sides of the axis C'. As depicted in FIGS. 3, 3A2, 3B, 3B1 and 3C, the axial depth of the collar portion 386 on one side of the axis C' is below the head portion 332 while the axial depth of the collar portion 386 on opposite side of the axis C' is sufficient to block lateral movement of the head portion 332 when the counterpart fastener members 320, 360 are in magnetic coupled fastening engagement. With the collar ends on opposite sides of the axis C' at different axial levels, the freedom of relative lateral or transverse movement between the counterpart fastener members 320, 360 can be restricted in a selected transverse direction or directions.

In some embodiments, the second fastener member 360 is identical to the fastener member 260 except for the collar portion. The description herein in relation to the magnetic fastener assembly 200 and the counterpart fastener members 220, 260 are incorporated herein, mutatis mutandis, with the corresponding numerals increased by 100 and the axes B and B' to become C and C' respectively.

An example magnetic fastener assembly 400 depicted in FIG. 4 comprises a first fastener member 420 and a second fastener member 460. The first fastener member 420 and a second fastener member 460 are in magnetic coupled fastening engagement and aligned along a coupling axis D-D'. In this example, the first fastener member 420 is identical to the fastener member 120 except for the head portion 432, and the second fastener member 460 can be identical to any one of the fastener members 160, 260 and 360.

The description herein in relation to the magnetic fastener assemblies 100, 200, 300 and the counterpart fastener members 120, and 160, 260 & 360 are incorporated herein, mutatis mutandis, with the corresponding numerals increased by 100, 200 or 300 where appropriate, and the axes of lateral symmetry are to become D and D' respectively.

In this example, the head portion 432 has a frustoconical shape and tapers to narrow towards the metal slab 142. The axial height of the head portion is to be higher (for example just slightly higher) than the axial depth of the collar end 186A, 286A, or the lower collar end 386A if the collar ends are at different axial depths. Apart from not having a clearly or sharp overhanging head portion relative to the neck portion, other aspects of the head portion 432 are similar or identical to that of corresponding head portions described herein.

In some embodiments such as the present, the head portion 432 tapers all the way until at surface level of the metal slab 442 and there is no clear delineation between the head portion 432 and the neck portion 434.

During operations, the inwardly inclining tapered surface of the head portion 432 is to interact or cooperate with the collar end 486A to resist or act against axial separation when an axial separation force is applied on two opposite or distal axial ends of the assembly in a separation direction when in the non-aligned magnetic coupled fastening engagement. The inclining tapered surface of the head portion 432 facilitates smoother transition to the aligned magnetic coupled fastening engagement or to detachment or disengagement position.

In some embodiments, tapering of the head portion 432 ends at an axial level above the surface level of the metal slab 442 and there is clear delineation between the head portion 432 and the neck portion 434. In such circumstances, the tapered portion of the head portion 432 overhangs the neck portion 434 and is axially above the collar end 486A of the second fastener member 460 when in the magnetic fastener assembly 400 is in the non-aligned magnetic coupled fastening engagement.

In general, an overhanging portion of the head portion 132, 232, 332, 432 projects, or is axially and/or immediately, above the collar end 186A, 286A, 386A, 486A, of the second fastener member 160, 260, 360, 460 when in the magnetic fastener assembly 100, 200, 300, 400 is in the non-aligned magnetic coupled fastening engagement. The overhang portion of the head portion 132, 232, 332, 432 is to cooperate with the collar end 186A, 286A, 386A, 486A to resist an axial separation force and against detachment when in this non-aligned magnetic coupled fastening engagement.

In some embodiments such as the present, the overhang portion of the head portion 132, 232, 332, 432 is to cooperate with the collar end 186A, 286A, 386A, 486A to form a latched configuration to resist an axial separation force and against detachment when in this non-aligned magnetic coupled fastening engagement.

Features set out in the claims hereto (jointly and severally where appropriate) are to form part of this disclosure and are incorporated herein by reference.

While various examples or embodiments have been described herein, it should be appreciated that they are for illustration and are not for scope restriction. For example, while the magnetic fastener 100 is used in example applications herein, other magnetic fasteners according to the disclosure such as magnetic fasteners 100-400 may be used without loss of generality. It should be appreciated that portions or parts of the various example embodiments can be excerpted for combination and/or mix-and-match where appropriate to form other variants without loss of generality.

| Table of numerals | |
|---|---|
| 100 | magnetic fastener assembly |
| 120 | first fastener member |
| 132 | head portion |
| 132A | overhanging portion |
| 134 | neck portion |
| 136 | Retention protrusion |
| 140 | First housing part |
| 142 | Metal slab |
| 142A | Front surface (1ˢᵗ coupling surface) |
| 142B | Rear surface |
| 142C | Peripheral surface |
| 144 | Attachment device |
| 144A | Bridging portion |
| 144B, C | Attachment pins |
| 160 | second fastener member |
| 170 | Second housing part |
| 172 | Metal slab |
| 174 | Attachment Device |
| 176 | Alignment protrusion |
| 178 | Reception aperture |
| 180 | Magnet slab |
| 182 | External casing |
| 182A | Rear portion |
| 182B | Peripheral wall |
| 182C | Front portion |
| 182D | Second coupling surface |
| 184 | Retention compartment |
| 186 | Collar portion |
| 186A | Collar end |
| 188 | Alignment head |

The invention claimed is:

1. A magnetic fastener assembly comprising a first fastener member and a second fastener member which are in detachable magnetic coupled fastening engagement along a magnetic coupling axis defining an axial direction and a magnetic coupling direction, wherein the first fastener member comprises a first retention part and a magnetic first coupling surface on the first retention part and the second fastener member comprises a second retention part and a magnetic second coupling surface on the second retention part;

wherein the first and the second retention parts are in a non-retained configuration when the first and the second fastener members are magnetic coupled in an aligned magnetic engagement position when the first and the second fastener members are aligned along the coupling axis;

wherein the first and the second retention parts are in a retained configuration when the first and the second fastener members are relatively moved away from the aligned magnetic engagement position into a non-aligned magnetic engagement position when the first and the second fastener members are not aligned on the coupling axis, the first and the second retention parts cooperating to define a releasable retention sub-assembly when in said non-aligned magnetic engagement position;

wherein the first and the second fastener members are movable out of magnetic coupled fastening engagement to detach from each other by application of an axial separation force on two opposite or distal axial ends of the fastener assembly in a separation direction along the coupling axis when the first fastener member and the second fastener member are in the aligned magnetic engagement position; and wherein the first fastener member and the second fastener member are to cooperate to resist or act against axial separation when the axial separation force is applied on two opposite or distal axial ends of the assembly in the separation direction, or the first fastener member and the second fastener member are latched and hold on to each other in latched engagement upon application of the axial separation force on two opposite or distal axial ends of the assembly in the separation direction, when the first fastener member and the second fastener member are in the non-aligned magnetic engagement position;

wherein the first retention part comprises a retention protrusion which projects from the first coupling surface of the first fastener member and extends along the coupling axis in the magnetic coupling direction, and wherein the second retention part comprises a retention receptacle having a retention compartment which is defined by cooperation of a central aperture of a ring magnet, the second coupling surface, a collar portion extending from the second coupling surface, and a ferromagnetic slab which is held on a rear magnetic surface of the ring magnet, wherein the collar portion projects from a reception aperture on the second coupling surface and extends inwardly towards the ferromagnetic slab, wherein a front magnetic surface of the ring magnet is in abutment with and defines the second coupling surface, and the ring magnet defines the magnetic coupling axis and the magnetic coupling direction, wherein the first and second coupling surfaces are oppositely facing and in magnetic coupling when the first and the second fastener members are in magnetic coupled engagement, and wherein the retention protrusion is received inside the retention receptacle when the first fastener member and the second fastener member are in said magnetic coupled engagement.

2. The magnetic fastener assembly according to claim 1, wherein the retention protrusion comprises a neck portion and a head portion, the neck portion projecting from the first coupling surface and extending in the axial direction along the coupling axis in the magnetic coupling direction and the head portion projecting transversely from the neck portion at an axial elevation from the first coupling surface;
   wherein the collar portion surrounds the reception aperture and includes a collar end which is distal from the second coupling surface;
   wherein the head portion is to move axially pass the collar end to enter into the retention compartment of the retention receptacle when the first and the second fastener members are to move along the coupling axis into the aligned magnetic engagement position and a portion of the head portion projects beyond the collar end such that the head portion is blocked from axially movement in the separation direction to move out of the retention receptacle when the first and the second fastener members are in the non-aligned magnetic engagement position; and
   wherein the head portion is to latch on the collar end when the first and the second fastener members are in the non-aligned magnetic engagement position and subject to application of the axial separation force at two opposite or distal axial ends of the fastener assembly.

3. The magnetic fastener assembly according to claim 2, wherein the second fastener member comprises an alignment protrusion, the alignment protrusion projecting axially from the ferromagnetic slab and extending in the magnetic coupling direction along the coupling axis towards the reception aperture on the second coupling surface, the alignment protrusion being in abutment and being in magnetic coupling with the head portion of the first retention part when in the aligned magnetic engagement position;
   wherein the collar portion includes a peripheral wall which extends between the second coupling surface and the collar end, and the peripheral wall tapers to narrow as it extends towards the collar end; and
   wherein the collar end is to permit axial passage of the head portion and the neck portion is translatable in a transverse direction after the head portion is moved into the aligned magnetic engagement position when the head portion is axially beyond the collar end.

4. The magnetic fastener assembly according to claim 2, wherein the collar end is inside the ring magnet and defines an entry aperture to the retention compartment and transverse extent of said head portion is slightly smaller than clearance defined by said entry aperture such that the head portion is substantially guided into the magnetic coupled fastening engagement along said coupling axis by said collar end to mitigate inadvertent detachment.

5. A magnetic fastener assembly comprising a first fastener member and a second fastener member which are in detachable magnetic coupled fastening engagement, wherein the first fastener member comprises a first magnetic coupling surface and the second fastener member comprises a second magnetic coupling surface, and wherein the first magnetic coupling surface and the second magnetic coupling surface are aligned along a magnetic coupling axis which defines a magnetic coupling direction;
   wherein the first fastener member comprises a retention protrusion, the retention protrusion projecting away from the first magnetic coupling surface and extending axially along an axial direction of the coupling axis towards the second magnetic coupling direction to form an elevated head portion, and wherein the head portion is at an axial elevation above the first magnetic coupling surface and extends radially or transversely away from the coupling axis to form an overhanging peripheral portion;
   wherein the second fastener member comprises a ring magnet having a central aperture and defining the magnetic coupling axis which passes through the central aperture, a ferromagnetic back slab which is held on a rear magnetic surface of the ring magnet to form a magnetic sub-assembly with the ring magnet, an alignment protrusion, a ferromagnetic housing formed around the magnetic sub-assembly, and an attachment device;
   wherein the ferromagnetic housing comprises a front portion which is in abutment with a front magnetic surface of the ring magnet and which has a forward-facing surface, and wherein the forward-facing surface has same magnetic polarity as the front magnetic surface of the ring magnet and defines the second magnetic coupling surface of the second magnetic fastener;
   wherein the front portion of the housing, the central aperture of the ring magnet and the back slab cooperate to define a retention compartment, and the alignment protrusion is formed inside the retention compartment;
   wherein a reception aperture is defined on the front portion of the ferromagnetic housing and a collar portion surrounds the reception aperture to define an entry aperture to the retention compartment;
   wherein the alignment protrusion extends axially along the coupling axis towards the reception aperture, and stops before the collar portion to define an axial clearance between the alignment protrusion and the collar portion; and
   wherein the alignment protrusion and the head portion are in magnetic coupled engagement and/or wherein the first magnetic coupling surface and the second magnetic coupling surface are in magnetic coupled engagement.

6. The magnetic fastener assembly according to claim 5, wherein the head portion of the first fastener member and the alignment protrusion are in abutment contact, and/or wherein the first magnetic coupling surface and the second magnetic coupling surface are in abutment contact.

7. The magnetic fastener assembly according to claim 5, wherein the head portion of the first fastener member has an axial extent along the coupling axis, and the axial clearance between the alignment protrusion and the collar portion of the second fastener member is slightly larger than the axial extent of the head portion of the first fastener member.

8. The magnetic fastener assembly according to claim 7, wherein the head portion of the first fastener member is free to translate laterally or transversely with respect to the coupling axis when the alignment protrusion and the head portion are in physical abutment and/or when the first magnetic coupling surface and the second magnetic coupling surface are in physical abutment when the first fastener member and the second fastener member are in detachable magnetic coupled fastening engagement.

9. The magnetic fastener assembly according to claim 5, wherein the first fastener member comprises a ferromagnetic first slab having a front surface and a rear surface, wherein the first magnetic coupling surface is formed on the front surface and an attachment device is attached to a rear surface of the first slab by a ferromagnetic rivet, and wherein the retention protrusion of the first fastener member is an integral part of the rivet which holds the attachment device to the first slab.

10. The magnetic fastener assembly according to claim 5, wherein the retention protrusion comprises a neck portion and a head portion, wherein the neck portion extends in an axial direction along the coupling axis to project away from the first magnetic coupling surface and the head portion comprises an overhanging portion at an axial elevation above the first magnetic coupling surface; and wherein the overhanging portion extends laterally or transversely to the axial direction.

11. The magnetic fastener assembly according to claim 5, wherein the alignment protrusion projects from the back slab and extends along the coupling axis inside the retention compartment.

12. The magnetic fastener assembly according to claim 5, wherein the reception aperture is axially aligned with the central aperture of the ring magnet and the alignment protrusion.

13. The magnetic fastener assembly according to claim 5, wherein the collar portion projects into the central aperture of the ring magnet, and wherein the head portion of the first fastener member is inside the central aperture of the ring magnet and extends axially between the alignment protrusion and the collar portion of the second fastener member.

14. The magnetic fastener assembly according to claim 13, wherein the collar portion extends axially inwards towards the back slab and has an axial end which defines an entry aperture into the retention compartment.

15. The magnetic fastener assembly according to claim 5, wherein the collar portion tapers to narrow on extending towards the back slab to define an entry aperture into the retention compartment.

16. The magnetic fastener assembly according to claim 5, wherein the collar portion on the second fastener member and the head portion on the first fastener member cooperate to form a guide means to guide the first fastener member and the second fastener member to move into the detachable magnetic coupled fastening engagement.

17. A magnetic fastener comprising a ring magnet having a central aperture and a ferromagnetic metal slab held on a rear magnetic surface of the ring magnet forming a sub-assembly, an attachment device and a ferromagnetic housing formed around the sub-assembly;

wherein the ring magnet has a magnetic coupling axis which passes through the central aperture and a front magnetic surface which defines a magnetic coupling direction of the magnetic fastener;

wherein the housing comprises a front portion which is in abutment with the front magnetic surface of the ring magnet to form a magnetic coupling surface of the magnetic fastener and the magnetic coupling surface has same magnetic polarity as the front magnetic surface of the ring magnet, wherein a reception aperture aligned with the central aperture of the ring magnet is defined on the front portion of the housing, and wherein the front portion of the housing comprises a collar portion which surrounds the reception aperture and which extends axially towards the metal slab and into the central aperture;

wherein the front portion of the housing, the collar portion, the central aperture of the ring magnet and the metal slab cooperate to define a retention compartment, and an alignment protrusion is formed inside the retention compartment; and wherein the alignment protrusion projects from the metal slab, extends axially along the coupling axis towards the reception aperture, and stops before the collar portion to define an axial clearance between the alignment protrusion and the collar portion.

18. The magnetic fastener according to claim 17, wherein the collar portion tapers to narrow on extending towards the metal slab.

19. The magnetic fastener according to claim 17, wherein the alignment protrusion is inside the central aperture and is laterally symmetrical or circularly symmetrical about the coupling axis, and wherein the alignment protrusion has a magnetic polarity which is same or opposite to the magnetic polarity of the front portion of the housing.

20. The magnetic fastener according to claim 17, wherein the attachment device is bound onto a rear surface of the metal slab by a ferromagnetic rivet and the alignment protrusion is an integral portion of the rivet that holds the metal slab and the attachment device.

\* \* \* \* \*